(12) United States Patent
Wilson et al.

(10) Patent No.: US 8,405,617 B2
(45) Date of Patent: Mar. 26, 2013

(54) GATED POWER MANAGEMENT OVER A SYSTEM BUS

(75) Inventors: Thomas James Wilson, Pleasanton, CA (US); Richard James Reeve, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1456 days.

(21) Appl. No.: 11/650,202

(22) Filed: Jan. 3, 2007

(65) Prior Publication Data

US 2008/0162967 A1    Jul. 3, 2008

(51) Int. Cl.
*G09G 5/00* (2006.01)

(52) U.S. Cl. .................. 345/173; 345/211; 713/322

(58) Field of Classification Search .......... 345/173–179, 345/211–213; 713/322, 600; 178/18.01–18.03
See application file for complete search history.

(56) References Cited

U.S. PATENT DOCUMENTS

| | | | |
|---|---|---|---|
| 5,369,771 A * | 11/1994 | Gettel | .................. 713/322 |
| 5,483,261 A | 1/1996 | Yasutake | |
| 5,488,204 A | 1/1996 | Mead et al. | |
| 5,710,929 A | 1/1998 | Fung | |
| 5,801,941 A | 9/1998 | Bertram | |
| 5,825,352 A | 10/1998 | Bisset et al. | |
| 5,835,079 A | 11/1998 | Shieh | |
| 5,880,411 A | 3/1999 | Gillespie et al. | |
| 5,987,614 A | 11/1999 | Mitchell et al. | |
| 6,073,195 A * | 6/2000 | Okada | .................. 710/301 |
| 6,115,823 A | 9/2000 | Velasco et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,622,216 B1 | 9/2003 | Lin | |
| 6,677,932 B1 | 1/2004 | Westerman | |
| 6,690,387 B2 | 2/2004 | Zimmerman et al. | |
| 6,813,674 B1 | 11/2004 | Velasco et al. | |
| 6,888,536 B2 | 5/2005 | Westerman et al. | |
| 7,015,894 B2 | 3/2006 | Morohoshi | |
| 7,016,705 B2 | 3/2006 | Bahl et al. | |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

International Search Report mailed Jul. 4, 2008, for PCT Application No. PCT/US2007/026170, filed Dec. 21, 2007, two pages.

(Continued)

*Primary Examiner* — Quan-Zhen Wang
*Assistant Examiner* — Jennifer Nguyen
(74) *Attorney, Agent, or Firm* — Morrison & Foerster LLP

(57) ABSTRACT

A method and system for managing power in a computer system is disclosed. In one embodiment the method includes providing output signals from a sensor panel to a controller, wherein the controller includes a data bus and a plurality of devices communicatively coupled to the data bus; monitoring an activity level on the data bus by monitoring bus access requests by one or more of the plurality of devices; and reducing or shutting off a bus clock frequency if there is reduced or no activity on the bus for a predetermined period of time.

17 Claims, 4 Drawing Sheets

U.S. PATENT DOCUMENTS

| | | | |
|---|---|---|---|
| 7,043,649 B2* | 5/2006 | Terrell, II | 713/322 |
| 7,093,153 B1 | 8/2006 | Witek et al. | |
| 7,184,064 B2 | 2/2007 | Zimmerman et al. | |
| 7,206,672 B2* | 4/2007 | Mueller | 701/1 |
| 7,207,014 B2 | 4/2007 | Velasco et al. | |
| 7,254,721 B1* | 8/2007 | Tobias et al. | 713/300 |
| RE40,153 E | 3/2008 | Westerman et al. | |
| 7,339,580 B2 | 3/2008 | Westerman et al. | |
| RE40,993 E | 11/2009 | Westerman | |
| 7,663,607 B2 | 2/2010 | Hotelling et al. | |
| 2004/0255175 A1* | 12/2004 | Oteki et al. | 713/300 |
| 2005/0055592 A1* | 3/2005 | Velasco et al. | 713/322 |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033722 A1 | 2/2006 | Chiu et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0097991 A1 | 5/2006 | Hotelling et al. | |
| 2006/0197753 A1 | 9/2006 | Hotelling | |
| 2007/0006006 A1* | 1/2007 | Henson | 713/322 |
| 2007/0067652 A1* | 3/2007 | Asai | 713/300 |
| 2008/0158175 A1 | 7/2008 | Hotelling et al. | |
| 2008/0158177 A1 | 7/2008 | Wilson et al. | |
| 2008/0162835 A1 | 7/2008 | Wilson et al. | |

FOREIGN PATENT DOCUMENTS

| | | |
|---|---|---|
| WO | WO-2008/085412 A2 | 7/2008 |
| WO | WO-2008/085412 A3 | 7/2008 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

\* cited by examiner

GATED POWER MANAGEMENT OVER A SYSTEM BUS

FIELD OF THE INVENTION

This disclosure relates to methods and systems wherein multiple devices can communicate over a data bus, and more particularly, to a method and system of reducing power consumption by monitoring activity over the data bus and adjusting bus clock frequencies and hence, power consumption, in accordance with the activity levels over the bus.

BACKGROUND OF THE INVENTION

One example of an electronic device that generates dynamic output signals is a user input device for performing operations in a computer system. Such input devices generate output signals based on user operation of the device or user data or commands entered into the device. The operations generally correspond to moving a cursor and/or making selections on a display screen. By way of example, the input devices may include buttons or keys, mice, trackballs, touch pads, joy sticks, touch screens and the like. Touch pads and touch screens (collectively "touch surfaces") are becoming increasingly popular because of their ease and versatility of operation as well as to their declining price. Touch surfaces allow a user to make selections and move a cursor by simply touching the surface, which may be a pad or the display screen, with a finger, stylus, or the like. In general, the touch surface recognizes the touch and position of the touch and the computer system interprets the touch and thereafter performs an action based on the touch.

Various types of touch screens are described in applicant's co-pending patent application Ser. No. 10/840,862, entitled "Multipoint Touchscreen," filed May 6, 2004, which is hereby incorporated by reference in its entirety. As noted therein, touch screens typically include a touch panel, a controller and a software driver. The touch panel is generally a clear panel with a touch sensitive surface. The touch panel is positioned in front of a display screen so that the touch sensitive surface covers the viewable area of the display screen. The touch panel registers touch events and sends these signals to the controller. The controller processes these signals and sends the data to the computer system. The software driver translates the touch events into computer events. There are several types of touch screen technologies including resistive, capacitive, infrared, surface acoustic wave, electromagnetic, near field imaging, etc. Each of these devices has advantages and disadvantages that are taken into account when designing or configuring a touch screen.

One significant performance factor associated with devices or systems utilizing touch surface technology is power consumption. This is especially true for portable devices or systems that rely on one or more batteries for power. During operation, touch surface devices typically consume relative large amounts of power, which can result in shorter battery for devices or systems (e.g., laptop computers, mobile telephones, digital audio players, etc.) that incorporate a touch surface device.

SUMMARY OF THE INVENTION

The invention addresses the above and other needs by providing a new method and system for managing power consumption by a device or system having multiple components or devices communicating over a data bus.

In one embodiment of the invention, separate clocks are provided to two or more devices or components communicatively coupled to a data bus, which is monitored by a bus arbiter. Depending on activity levels associated with each of the devices, the clock frequencies to each of the two or more devices can be slowed down or completely shut off. This permits slowing or shutting down certain devices if they are not being used, which reduces system power consumption.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention. Furthermore, although embodiments of the present invention are described herein in terms of devices and applications compatible with computer systems and devices manufactured by Apple Computer, Inc. of Cupertino, Calif., such embodiments are illustrative only and should not be considered limiting in any respect.

Figure 1:
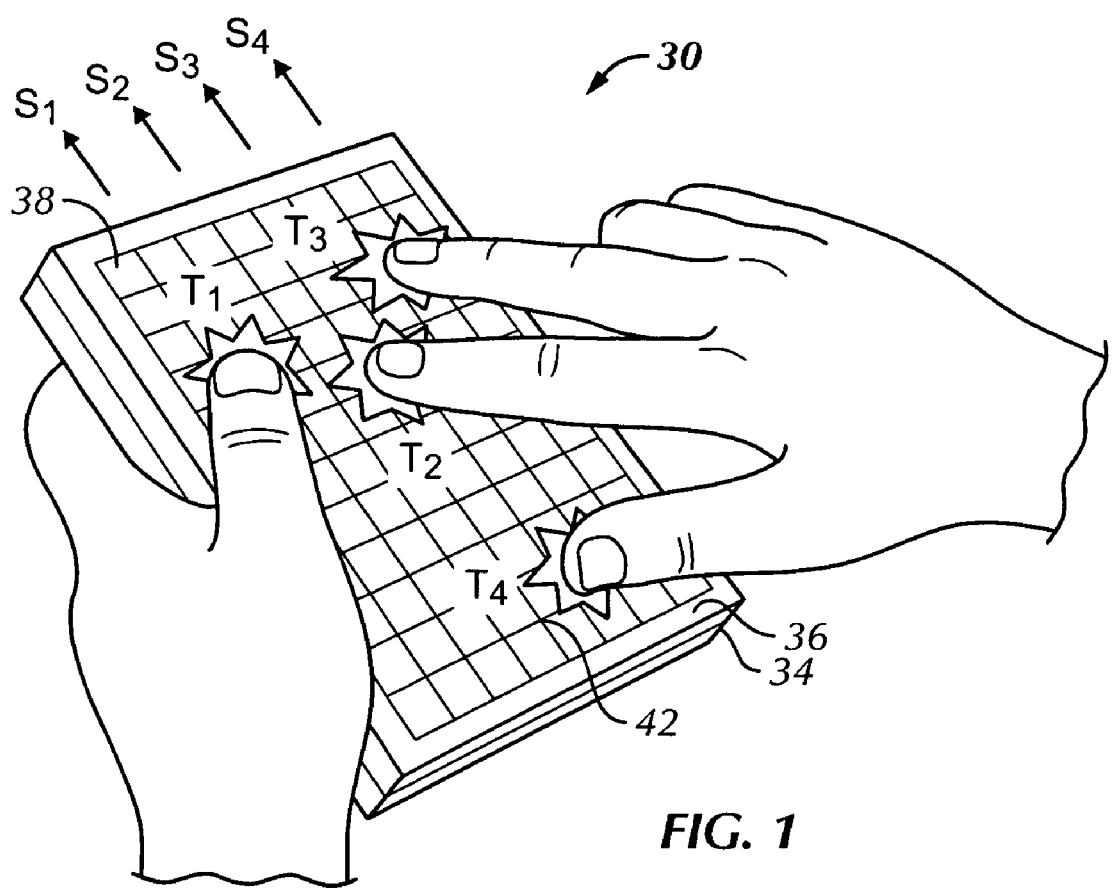
FIG. 1 illustrates an exemplary touch surface device.

FIG. 1 illustrates a touch screen display arrangement 30, which includes a display 34 and a transparent touch screen 36 positioned in front of display 34. Display 34 may be configured to display a graphical user interface (GUI) including perhaps a pointer or cursor as well as other information to the user. Transparent touch screen 36 is an input device that is sensitive to a user's touch, allowing a user to interact with the graphical user interface on display 34. In general, touch screen 36 recognizes touch events on surface 38 of touch screen 36 and thereafter outputs this information to a host device. The host device may, for example, correspond to a computer such as a desktop, laptop, handheld or tablet computer. The host device interprets the touch event and thereafter performs an action based on the touch event.

In one embodiment, touch screen 36 is configured to recognize multiple touch events that occur simultaneously at different locations on touch sensitive surface 38. That is, touch screen 36 allows for multiple contact points T1-T4 to be tracked simultaneously. Touch screen 36 generates separate tracking signals S1-S4 for each touch point T1-T4 that occurs on the surface of touch screen 36 at the same time. In one embodiment, the number of recognizable touches may be about fifteen which allows for a user's ten fingers and two palms to be tracked along with three other contacts. The multiple touch events can be used separately or together to perform singular or multiple actions in the host device. Numerous examples of multiple touch events used to control a host device are disclosed in U.S. Pat. Nos. 6,323,846; 6,888,536; 6,677,932; 6,570,557, and co-pending U.S. patent application Ser. Nos. 11/015,434; 10/903,964; 11/048,264; 11/038,590; 11/228,758; 11/228,700; 11/228,737; 11/367,749, each of which is hereby incorporated by reference in its entirety.

Figure 2:
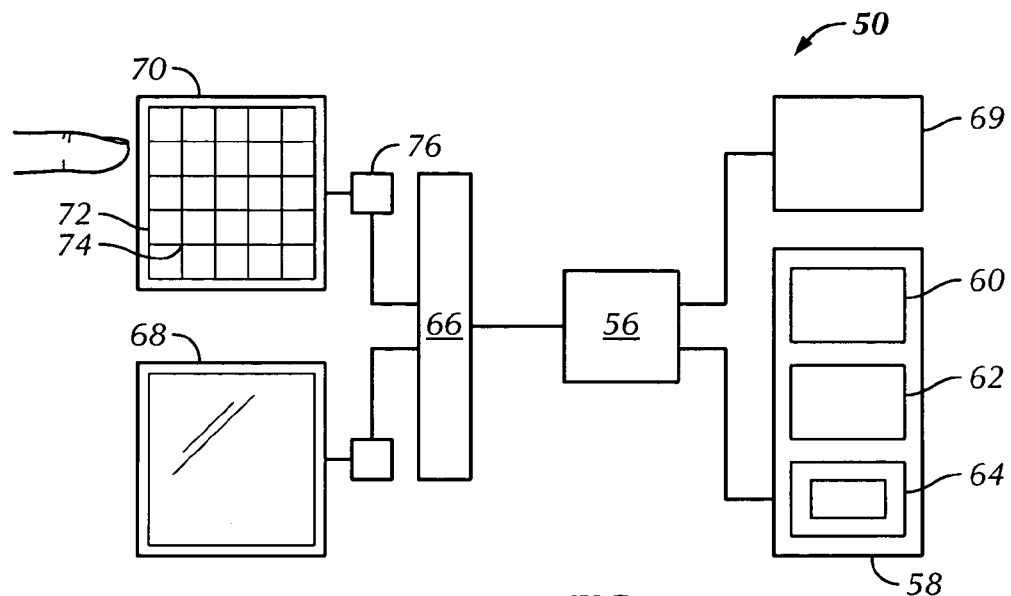
FIG. 2 is a block diagram of a computing device or system incorporating a touch surface device, in accordance with one embodiment of the invention.

FIG. 2 is a block diagram of a computer system 50, employing a multi-touch touch screen. Computer system 50 may be, for example, a personal computer system such as a desktop, laptop, tablet, handheld computer, mobile telephone, digital audio and/or video player, etc. The computer system could also be a public computer system such as an information kiosk, automated teller machine (ATM), point of sale machine (POS), industrial machine, gaming machine, arcade machine, vending machine, airline e-ticket terminal, restaurant reservation terminal, customer service station, library terminal, learning device, etc.

Computer system 50 includes a processor 56 configured to execute instructions and to carry out operations associated with the computer system 50. Computer code and data required by processor 56 are generally stored in storage block 58, which is operatively coupled to processor 56. Storage block 58 may include read-only memory (ROM) 60, random access memory (RAM) 62, hard disk drive 64, and/or removable storage media such as CD-ROM, PC-card, floppy disks, and magnetic tapes. Any of these storage devices may also be accessed over a network. Computer system 50 also includes a display device 68 that is operatively coupled to the processor 56. Display device 68 may be any of a variety of display types including liquid crystal displays (e.g., active matrix, passive matrix, etc.), cathode ray tubes (CRT), plasma displays, etc.

Computer system 50 may include a first input device 69, such as a keyboard or key pad, as well as a touch screen 70, which is operatively coupled to the processor 56 by I/O controller or interface 66 and touch screen controller 76. (The I/O controller 66 may be integrated with the processor 56, or it may be a separate component.) The touch screen 70 is typically a transparent panel that is positioned in front of the display device 68, and may be integrated with the display device 68 or it may be a separate component. Touch screen 70 is configured to receive input from a user's touch and to send this information to the processor 56. In most cases, touch screen 70 recognizes touches and the position and magnitude of touches on its surface.

The host processor 56 receives outputs from the touch screen controller 76 and performs actions based on the outputs. Such actions may include, but are not limited to, moving an object such as a cursor or pointer, scrolling or panning, adjusting control settings, opening a file or document, viewing a menu, making a selection, executing instructions, operating a secondary device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

The host processor 56 may also perform additional functions that may not be related to MT panel processing, and may be coupled to program storage 58 and the display device 68 such as an LCD display for providing a user interface (UI) to a user of the device. In one embodiment, the computer system 50 may be a single device, such as a laptop computer, Apple Ipod™ music/video player, or cellular telephone, having all of the components/modules illustrated in FIG. 2 contained within a single housing of the device.

In one embodiment, the touch screen panel 70 can be implemented as a mutual capacitance device constructed as described below with reference to FIGS. 3A and 3B. In this embodiment, the touch screen panel 70 is comprised of a two-layered electrode structure, with driving lines or electrodes on one layer and sensing lines or electrodes on the other. In either case, the layers are separated by a dielectric material (not shown). In the Cartesian arrangement of FIG. 3A, one layer is comprised of N horizontal, preferably equally spaced row electrodes 81, while the other layer is comprised of M vertical, preferably equally spaced column electrodes 82. In a polar arrangement, illustrated in FIG. 3B, the sensing lines may be concentric circles and the driving lines may be radially extending lines (or vice versa). As will be appreciated by those skilled in the art, other configurations based on a variety of coordinate systems are also possible. Additionally, it is understood that the invention is not necessarily limited to touch surface devices utilizing mutual capacitance sensing nodes. The invention may be implemented within other types of touch surface devices such as "self capacitance" devices, for example.

Each intersection 83 represents a pixel and has a characteristic mutual capacitance, $C_{SIG}$. A grounded object (such as a finger) that approaches a pixel 83 from a finite distance shunts the electric field between the row and column intersection, causing a decrease in the mutual capacitance $C_{SIG}$ at that location. In the case of a typical sensor panel, the typical signal capacitance $C_{SIG}$ is about 1.0 picofarads (pF) and the change ($\Delta C_{SIG}$) induced by a finger touching a pixel, is about 0.10 pF. These capacitance values are exemplary only and should not in any way limit the scope of the present invention.

The electrode material may vary depending on the application. In touch screen applications, the electrode material may be ITO (Indium Tin Oxide) on a glass substrate. In a touch tablet, which need not be transparent, copper on an FR4 substrate may be used. The number of sensing points 83 may also be widely varied. In touch screen applications, the number of sensing points 83 generally depends on the desired sensitivity as well as the desired transparency of the touch screen 70. More nodes or sensing points generally increases sensitivity, but reduces transparency (and vice versa).

During operation, each row electrode (i.e., drive electrode) is sequentially charged by driving it with a predetermined voltage waveform (discussed in greater detail below). The charge capacitively couples to the column electrodes (i.e., sense electrodes) at the intersections between the drive electrode and the sense electrodes. In alternative embodiments the column electrodes can be configured as the drive electrodes and the row electrodes can be configured as the sense electrodes. The capacitance of each intersection 83 is measured to determine the positions of multiple objects when they touch the touch surface. Sensing circuitry monitors the charge transferred and time required to detect changes in capacitance that occur at each node. The positions where changes occur and the magnitude of those changes are used to identify and quantify the multiple touch events.

Figure 4:
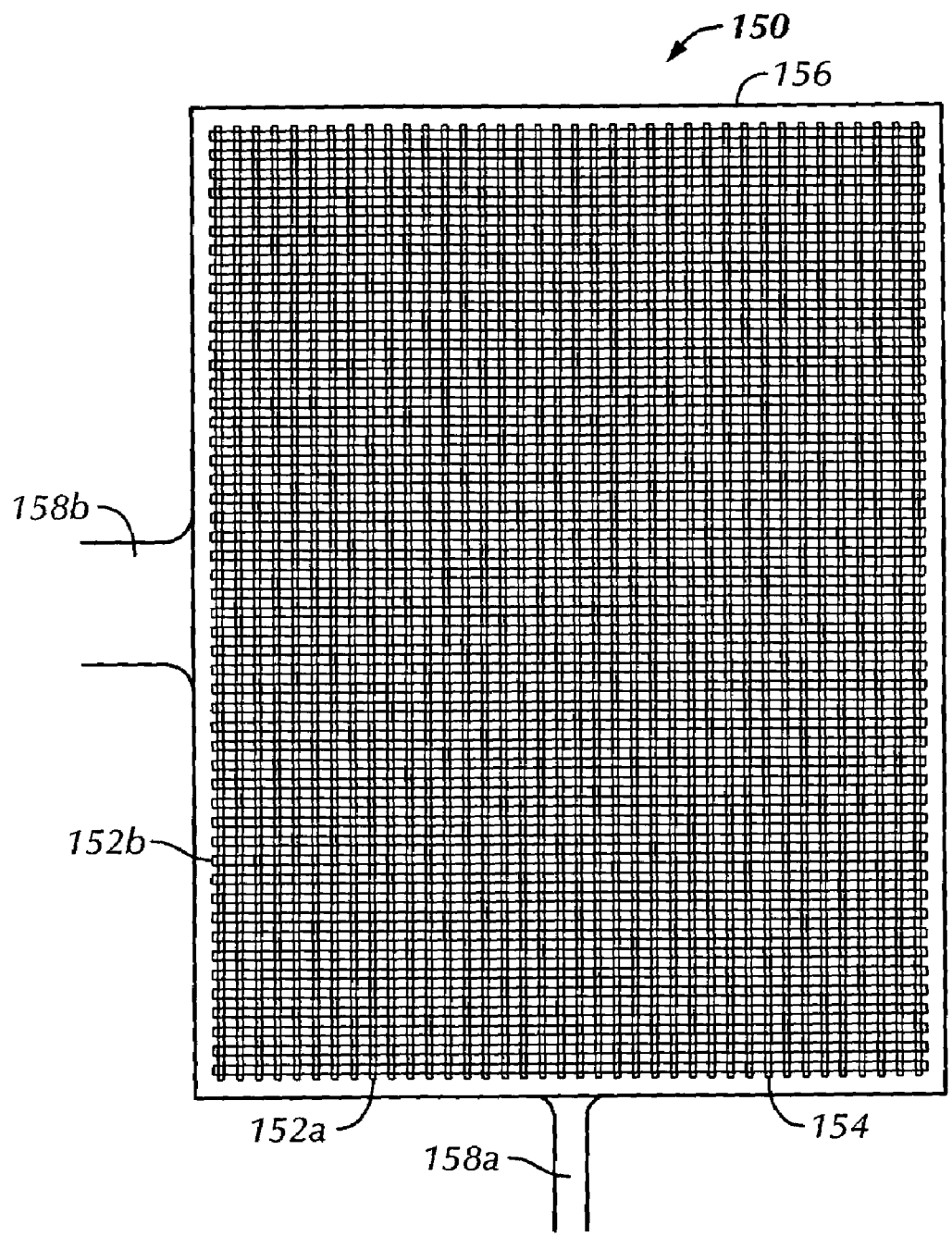
FIG. 4 illustrates a transparent multipoint touch screen, in accordance with one embodiment of the present invention.

FIG. 4 is a top view of a transparent multipoint touch screen 150, in accordance with one embodiment of the present invention. As shown, the touch screen 150 includes a two layer grid of spatially separated lines or wires 152. In most cases, the lines 152 on each layer are parallel to one another. Furthermore, although in different planes, the lines 152 on the different layers are configured to intersect or cross in order to produce capacitive sensing nodes 154 (a.k.a., "pixels"), which each represent different coordinates in the plane of the touch screen 150. The nodes 154 are configured to receive capacitive input from an object touching the touch screen 150 in the vicinity of the node 154. When an object (e.g., a finger tip) is proximate the node 154, the object steals charge thereby affecting the capacitance at the node 154. It has been found that as a finger is pressed more firmly against the touch screen surface 150, the surface area of the finger touching the touch screen 150 increases and a greater amount of charge is diverted away from the underlying sensing node(s) 154.

The lines 152 on different layers serve two different functions. One set of lines 152A drives a current therethrough while the second set of lines 152B senses the capacitance coupling at each of the nodes 154. In one embodiment, the top layer provides the driving lines 152A while the bottom layer provides the sensing lines 152B. The driving lines 152A are connected to a voltage source (not shown) that separately drives the current through each of the driving lines 152A. That is, the stimulus is only happening over one driving line while all the other driving lines are grounded. They may be driven similarly to a raster scan. Each sensing line 152B is connected to a capacitive sensing circuit (not shown) that senses a charge and, hence, capacitance level for the sensing line 152B.

When driven, the charge on the driving line 152A capacitively couples to the intersecting sensing lines 152B through the nodes 154 and the capacitive sensing circuits sense their corresponding sensing lines 152B in parallel. Thereafter, the next driving line 152A is driven, and the charge on the next driving line 152A capacitively couples to the intersecting sensing lines 152B through the nodes 154 and the capacitive sensing circuits sense all of the sensing lines 152B in parallel. This happens sequentially until all the lines 152A have been driven. Once all the lines 152A have been driven, the sequence starts over (continuously repeats). As explained in further detail below, in one embodiment, the capacitive sensing circuits are fabricated on an application specific integrated circuit (ASIC), which converts analog capacitive signals to digital data and thereafter transmits the digital data over a serial bus to a host controller or microprocessor for processing.

The lines 152 are generally disposed on one or more optical transmissive members 156 formed from a clear material such as glass or plastic. By way of example, the lines 152 may be placed on opposing sides of the same member 156 or they may be placed on different members 156. The lines 152 may be placed on the member 156 using any suitable patterning technique including for example, deposition, etching, printing and the like. Furthermore, the lines 152 can be made from any suitable transparent conductive material. By way of example, the lines may be formed from indium tin oxide (ITO). The driving lines 152A may be coupled to the voltage source through a flex circuit 158A, and the sensing lines 152B may be coupled to the sensing circuits via a flex circuit 158B. The sensor ICs may be attached to a printed circuit board (PCB).

The distribution of lines 152 may be widely varied. For example, lines 152 may be positioned almost anywhere in the plane of touch screen 150. The lines 152 may be positioned randomly or in a particular pattern about the touch screen 150. With regards to the latter, the position of the lines 152 may depend on the coordinate system used. For example, the lines 152 may be placed in rows and columns for Cartesian coordinates or concentrically and radially for polar coordinates. When using rows and columns, the rows and columns may be placed at various angles relative to one another. For example, they may be vertical, horizontal or diagonal.

Figure 5:
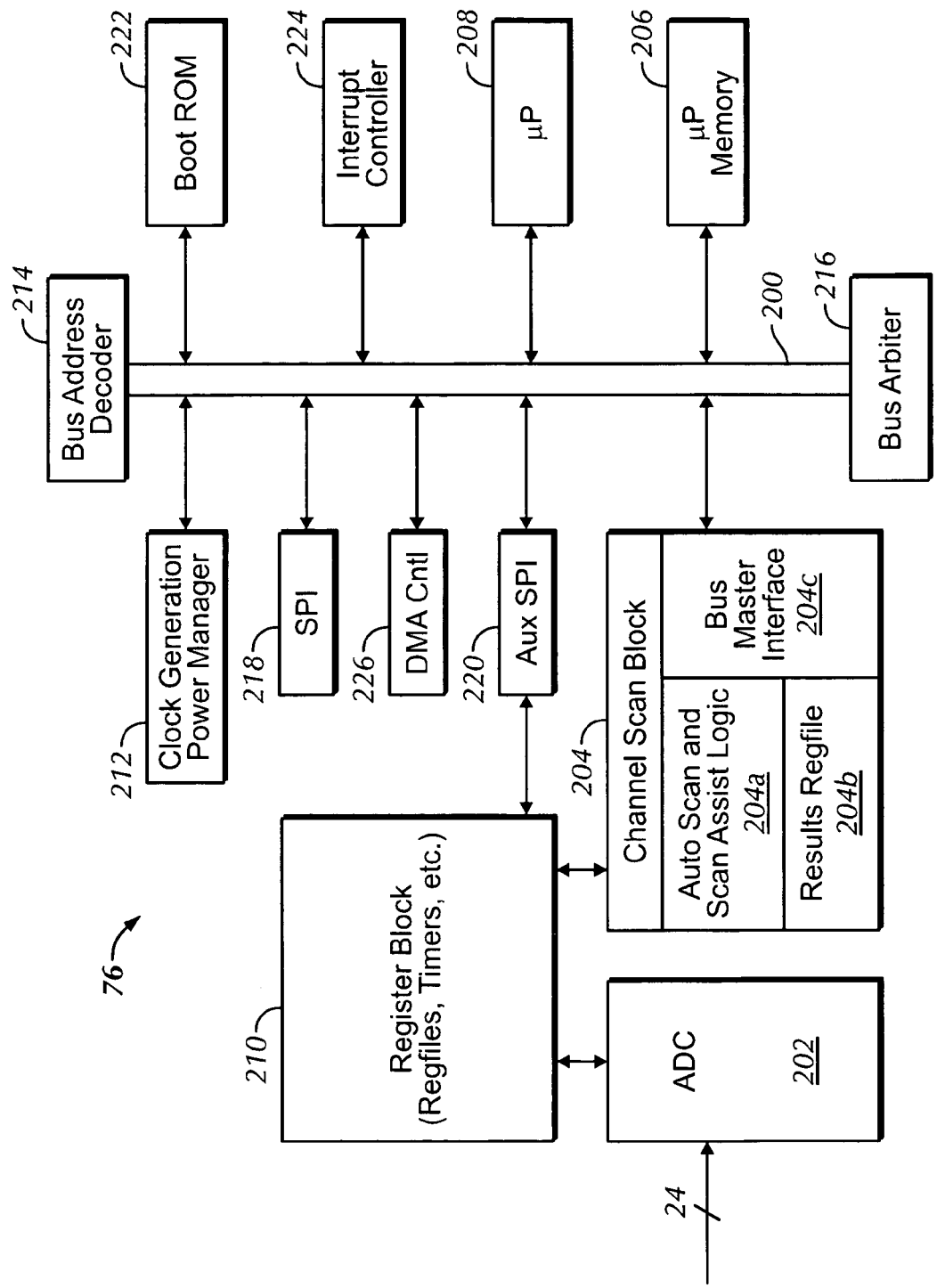
FIG. 5 is a block diagram of a controller capable of implementing power management functions, in accordance with one embodiment of the present invention.

FIG. 5 is a block diagram illustrating various components of the controller 76 (FIG. 2) configured for implementing power management operations, in accordance with one embodiment of the invention. In one embodiment, the controller 76 is embodied in an application specific integrated circuit (ASIC) 76 containing all the devices or components illustrated in FIG. 5. The controller 76 includes a data bus 200 through which internal devices or modules communicate. In one embodiment, the data bus is an Advanced High-performance Bus (AHB) manufactured by Arm, Ltd., and is capable of high frequency burst transfers, split transactions, single cycle bus mater handover, single clock edge operation and non-tristate implementation.

Figure 3A:
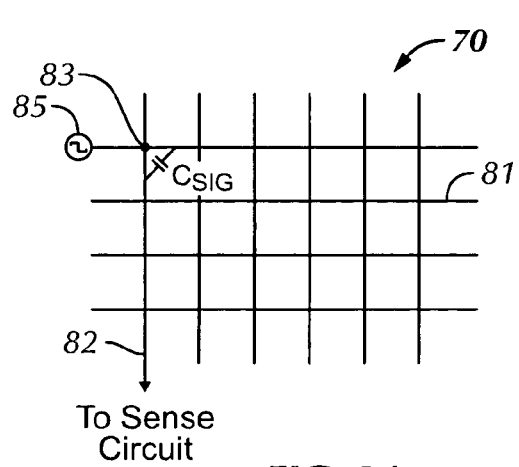
FIGS. 3A and 3B illustrate two possible arrangements of drive and sense electrodes in a touch screen panel, in accordance with two embodiments of the invention.
Figure 3B:
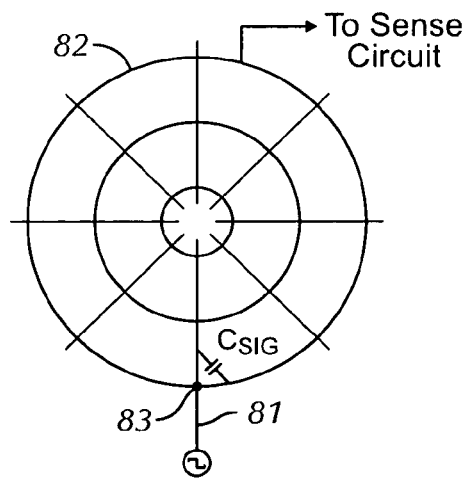

The controller 76 further includes a plurality of analog-to-digital conversion (ADC) channels 202 which are coupled to a plurality of (e.g., twenty four) output sense lines (e.g., the column electrodes 82 (FIG. 3A)) of a touch surface panel 70 (FIG. 3A). The ADC channels 202 receive sensed output signals (e.g., $Q_{SIG}$ or $Q_{SIG}-\Delta Q_{SIG}$) from each respective sense line 82, indicative of touch or no-touch conditions on the panel 70. The coupling of sense electrodes or lines 82 to the ADC channels 202 may be implemented by a flex circuit 158B (FIG. 4), for example. The ADC channels 202 convert the analog sensed signals from the panel into digital signals having a predetermined digital format and, thereafter, provide the digital signals to a channel scan logic block 204 for further processing.

Each ADC channel 202 may have one or more sense lines 82 coupled to the channel 202. In one embodiment, the plurality of ADC channels 202 includes twelve ADC channels each having a two-to-one multiplexer (not shown) at its input for multiplexing two sense line inputs received from flex circuit 158B. Thus, twenty-four sense lines 82 may be coupled to twelve ADC channels by means of a two-to-one multiplexer located at each channel 202 input. Furthermore, in one embodiment, the plurality of ADC channels 202 each include a charge amplifier (not shown) at its input stage and further provides for output signal compensation, elimination of stray capacitance effects, and mixing for improved signal-to-noise ratios, among other functions. A detailed discussion of the ADC channels 202 and related circuitry can be found in co-pending and commonly owned application Ser. No. 11/650,038 entitled "Minimizing Mismatch During Compensation," filed Jan. 3, 2007, the entirety of which is incorporated by reference herein.

The channel scan block 204 receives the digital signals from the ADC channels 202 and initially stores them as scan results data in a register (Results Regfile) 204b, from where they are eventually transferred (e.g., in burst mode) to an internal memory 206. Depending on application and system requirements, the internal memory 206 may include any one or more of a plurality of data storage devices and types (e.g., RAM, ROM, Flash, etc.) that are well known in the art. However, for purposes of simplicity, internal memory 206 is illustrated and discussed herein as a generic, single memory module. When scan results data has been stored for at least one scan of all drive electrodes 81 of the panel 70, the resulting panel "image" is processed by a microprocessor 208 to determine whether a touch or multi-touch condition is present on the panel 70. In one embodiment, the microprocessor 208 is an ARM968E-S processor manufactured by ARM, Ltd., In one embodiment, the channel scan block 204 can access internal memory 206 (e.g., RAM), autonomously read data from the analog channels 202, and provide control for the analog channels 202. This control may include multiplexing column/sense electrodes of the panel 70 to the analog channels 202. The channel scan block 204 includes an auto-scan & scan-assist logic block 204a which performs the functions of obtaining scan data from the panel 70 (in scan-assist mode) or comparing result data against a threshold to determine if a touch event has occurred on the panel 70 (in auto-scan mode). In one embodiment, in auto-scan mode, if a signal level is detected that exceeds the threshold value, it will inform the clock generation/power manager 212, which will "wake up" controller 76 from a low power sleep mode.

The channel scan block 204 further includes a register 204b (Results Regfile) for temporarily storing scan results data prior to transferring the results data to microprocessor memory 206 for further processing. A bus master interface 204c provides an interface to transfer the results data to the memory 206. Additionally, the bus master interface 204c can also serve as a communication interface to allow data transfer between the channel scan block 204 and the AUX SPI 220 or other internal or external devices.

The controller 76 further includes a register block or module 210 that contains one or more registers for storing programming, control and/or state information used to program and control timing and operation of various components of the control module 76 illustrated in FIG. 5.

A clock generation and power manager module (CGPMM) 212 provides one or more clock signals to the various modules in the controller 76, as necessary, to provide timing and synchronization to controller operations. In one embodiment, the CGPPM 212 includes a clock tree (not shown) to provide separate clock signals to at least two or more of the various devices illustrated in FIG. 5. As described in further detail below, the CGPPM 212 slows down frequencies or shuts off clocks to devices within the controller 76 depending on a level of activity by those devices, in accordance with various embodiments of the invention. In one embodiment, one or more frequency dividers and logic switches (a.k.a., logic gates) coupled to one or more branches of a clock tree can be utilized to slow down frequencies or shut off clocks to selected devices. Such frequency dividers and switches/gates are well known in the art.

A bus address decoder 214 decodes address signals or packets in order to provide access to corresponding physical addresses or locations within the internal memory 206 to microprocessor 208 and channel scan logic module 204. Various address decoders known in the art may be utilized in accordance with present invention. In one embodiment, the address decoder 214 provides a selection signal to the CGPMM 212 that turns on a switch or gate coupled to a branch of the clock tree, thereby providing a clock signal from the clock tree branch to a selected device coupled to the branch.

The controller 76 further includes a bus arbiter 216 for monitoring and controlling access to the data bus 200 by the various modules (e.g., channel scan logic module 204, microprocessor 206, communication interface 218, etc.) contained within the controller 76. In one embodiment, the arbiter 216 can include a Round Robin arbiter, which provides bus access to the various devices coupled to the bus in accordance with a round-robin protocol. Other access priority protocols may also be implemented and designed using control logic for particular applications, as will be readily apparent to those of ordinary skill in the art. In one embodiment, the arbiter 216 sends control signals to the address decoder 214 and CGPMM 212 to control their operations.

A serial peripheral interface (SPI) 218 allows the controller 76 to communicate with one or more external devices, such as host processor 56 (FIG. 2), in accordance with a predetermined communication protocol and data format. In one embodiment of the invention, the SPI 218 contains logic circuitry (e.g., state machines or modules) for autonomously interpreting data packets received from the host microprocessor 56 or other external device and performing memory access functions autonomously (i.e., with little or no intervention from the internal microprocessor 208). In one embodiment, the SPI 218 is a full-duplex master or slave-synchronous serial interface. The microprocessor 208 can access data, control, and status information on the SPI 218 via the data bus 200 interface. A detailed disclosure of an exemplary communication protocol that may be implemented between SPI 218 and an external device, such as host communication interface 66 (FIG. 2) is provided in commonly-owned and co-pending application Ser. No. 11/650,118 entitled "Memory Access Without Internal Memory Intervention," filed Jan. 3, 2007, the entirety of which is incorporated by reference herein.

The controller 76 further includes an auxiliary serial peripheral interface (AUX SPI) 220 that provides a communication interface for the controller 76 to communicate with another controller or external device (not shown) in a Master/Slave mode of operation. In one embodiment, the AUX SPI 220 is a full-duplex master or slave-synchronous serial interface. The microprocessor 208 can access data, control, and status information on the AUX SPI 220 via the data bus 200 interface. A detailed disclosure of an exemplary touch surface device having two controllers 76 configured to operate and communicate as Master and Slave controllers via respective AUX SPIs 220 is provided in commonly-owned and co-pending application Ser. No. 11/650,042, entitled "Master/Slave Mode Method and System," filed Jan. 3, 2007, the entirety of which is incorporated by reference herein.

A boot ROM 222 is used to store boot or start-up code that is executed by the microprocessor 208 upon system start-up or reset. In one embodiment, the system can either boot from the boot ROM 222 or from an external source. A disclosure of an exemplary method of booting from an external source is provided in application Ser. No. 11/650,118, entitled "Memory Access Without Internal Memory Intervention," incorporated by reference above.

The controller 76 also includes an interrupt controller 224 for providing an interface to interrupt operations within the controller 76. The interrupt controller 224 determines the identity of the device or source requesting an action or service and which secondary device can perform the requested action or service. The interrupt controller 224 supplies a starting address, or vector address, of an identified secondary device to primary device requesting a service. In one embodiment, two levels of interrupt are available: (1) Fast Interrupt request (FIQ) for fast, low latency interrupt handling; and (2) Interrupt Request (IRQ) for more general interrupts. In various embodiments, the interrupt controller 224 may be implemented in hardware, firmware, software or a combination of these implementations.

A direct memory access (DMA) controller 226 supports single DMA and burst DMA transfers between two memories, two registers, or a memory and register within the controller 76. In one embodiment, the DMA controller 226 includes two channels for supporting DMA requests from a plurality of primary and secondary devices. As used herein a "primary device" refers to a device that initiates actions and transmits commands to "secondary devices," which perform some action (e.g., send back data or acknowledgement) in response to the command sent by the primary device. In one embodiment, each DMA channel is assigned a specific priority. If requests from two channels become active at the same time the channel with the highest priority wins. The DMA controller can further provide handshake interfaces for SPI 218 and AUX SPI 220, discussed above. In one embodiment, the DMA controller 226 includes an internal first-in-first-out (FIFO) memory (not shown) for storing a predetermined amount (e.g., 16 bytes) of burst data.

In one embodiment, the following devices are configured as primary devices within the controller 76: the microprocessor 208, the channel scan logic master interface 204c, and the DMA controller 226 (the DMA be both a primary and secondary device on the bus 200). The remaining devices or modules illustrated in FIG. 5 are configured as secondary devices. The configuration of each of these devices, their bus access priorities, operating and timing parameters, and other control functions, may be set by programming designated registers (not shown) residing in the register block 210, or within the respective devices themselves. Use of such control registers to configure the operation of digital circuits is well known in the art.

In one embodiment, the data bus 200 implements a bus protocol that uses a central multiplexer interconnection scheme. Under this scheme primary devices transmit address and control signals indicating a transfer to be performed and the arbiter 216 determines which secondary device to send the address and control signals to. The address decoder 214 controls where the address and control signals are sent and where any results (e.g., read data) are sent. Before a data bus transfer can commence a primary device (e.g., microprocessor 208) must be granted access to the data bus 200. The primary device starts this process by asserting a request signal to the arbiter 216. The arbiter 216 then indicates when the primary device will be granted use of the bus 200. Upon being granted bus access, the primary device starts a data transfer by driving the address and control signals. In one embodiment, these signals provide information on the address, direction and width of the transfer, as well as an indication if the transfer forms part of a burst. Every transfer consists of an address and control cycle, and one or more cycles for the data. In one embodiment, the address cycle cannot be extended and, therefore, the designated secondary device must sample the address during this time. The data cycle, however, can be extended by transmitting a signal to set an appropriate register bit, which causes wait states to be inserted into the transfer and allows extra time for the secondary device to provide or sample data.

In accordance with various embodiments of the invention, use of dynamic clock control is implemented to lower overall power consumption by the controller 76. In one embodiment, power consumption can be reduced using two methods. First, the data bus 200 clock frequency is slowed during time of bus inactivity. Second, one or more clocks provided to one or more secondary devices are stopped when the secondary devices are not being actively accessed or used.

In one embodiment, the microprocessor 208 uses a single clock signal (CLK) to time all internal operations and the controller 76 is programmable to support full, half and quarter CLK speeds on the data bus 200. In a further embodiment of the invention, the data bus 200 clock speed may be further reduced dynamically. For example, when the bus 200 is inactive, the bus clock can be further reduced by a factor two, four or eight, for example, depending on length of inactivity or other factors. The bus arbiter 216 determines bus inactivity or levels of inactivity. In one embodiment, the bus 200 is deemed to be inactive when none of the primary devices are requesting use of the bus, there are no current active transactions, and there has been no activity on the bus for a programmable number of bus clock cycles. Once activity is detected on the bus, the bus clock is returned to its normal program clock speed and remains at this active frequency until there has been no activity on the bus for the programmable number of bus clock cycles.

In a further embodiment of the invention, in addition to a frequency reduction in the clock for the data bus 200, individual secondary devices can have their clocks dynamically turned on and off based upon bus usage and activity. Clocks to primary devices are never shut off and can only be reduced. In one embodiment, each secondary device on the data bus 200 has it own dedicated clock, which may be independently turned on or off. When a secondary device is enabled for dynamic clock control, the clock generation/power manager module 212 will only turn on the clock to the secondary device when these is an active access to the secondary device. As mentioned above, in one embodiment, system configuration parameters such as when and how much to reduce bus clock frequency, which secondary devices to enable for dynamic clock control, etc., can be set by programming designated control registers (not shown) within register block 210.

In one embodiment, the data bus 200 incorporates a two stage pipelined bus architecture. The first stage of the pipeline is used to provide information on the address, direction, and width of the transfer, as well as an indication if the transfer forms part of a burst. The address phase cannot be extended and therefore all secondary devices must sample the address during this time. The second stage of the pipeline is used to provide data. The data stage can be extended using a signal (PRIMARY_READY) to set an appropriate control register bit. When LOW, for example, this signal causes wait states to be inserted into the transfer and allows extra time for the secondary device to provide or sample data.

In one embodiment, when the arbiter 216 determines the current request in the address phase is to a secondary device with dynamic clocking enabled, the arbiter 216 informs the clock generation/power manager module 212, which then turns on the clock to the secondary device on the following cycle. The data bus 200 holds the information provided in the address phase for an extra cycle. In one embodiment, this information is held by a register within the bus 200. The registered information is selected by the bus 200 on the following cycle, thus providing the address information for an extra cycle. This stall allows the secondary clock to start, and for the secondary device to sample the information provided during the address phase. In addition, when an access to an un-clocked secondary device is detected, the bus 200 forces the control signal (PRIMARY_READY) inputs to the primary devices to be LOW, for example, and forces the control signal inputs to one or more secondary devices to be HIGH. This forces the primary devices to stall for a cycle, while allowing the secondary devices an extra cycle to capture the information in the address phase.

While various embodiments of the present invention have been described above, it should be understood that they have been presented by way of example only, and not of limitation. For example, although the disclosure is primarily directed at touch surface devices that utilize capacitive sensing, some or all of the features described herein may be applied to other sensing methodologies. Additionally, although embodiments of this invention are primarily described herein for use with touch sensor panels, proximity sensor panels, which sense "hover" events or conditions, may also be used to generate modulated output signals for detection by the analog channels. Proximity sensor panels are described in Applicants' co-pending U.S. application Ser. No. 11/649,998 entitled "Proximity and Multi-Touch Sensor Detection and Demodulation," filed concurrently herewith as the entirety of which is incorporated herein by reference. As used herein, "touch" events or conditions should be construed to encompass "hover" events and conditions and "touch surface panels" should be construed to encompass "proximity sensor panels." Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations. Additionally, as used herein, a "module" may be implemented in hardware, firmware, software or any combination of these technologies as may be appropriate for the module's functionality.

What is claimed is:

1. A method of managing power in a computer system utilizing a touch surface device wherein a controller includes at least one primary device capable of being communicatively coupled to the data bus and a plurality of secondary devices capable of being communicatively coupled to the data bus, the at least one primary device capable of actively accessing the plurality of secondary devices by initiating actions and transmitting commands to the plurality of secondary devices, and the secondary devices capable of performing actions in response thereto, the method comprising:
   providing scanned data output signals from a touch surface of the touch surface device to the controller;
   comparing values of the scanned data to a threshold;
   if the values of the scanned data exceed the threshold, terminating a low power mode of the controller and initiating a high power mode;
   monitoring an activity level on the data bus by monitoring at least bus access requests by the at least one primary device ;
   reducing a data bus clock frequency of the data bus if the data bus is inactive for a first predetermined period of time;
   providing at least one clock signal to each of the plurality of second devices;
   discontinuing providing the at least one clock signal to at least one of the secondary devices unless there is an active access to the at least one secondary device by the at least one primary device or the at least one secondary device is in use.

2. The method of claim 1 further comprising:
   providing a clock signal to the at least one primary device;
   reducing, but not turning off a clock frequency to the at least one primary device if there is reduced or no activity on the data bus from the at least one primary device.

3. The method of claim 2, wherein the clock frequency applied to the data bus is slowed when the at least one primary device has not requested access to the bus and there has been no activity on the data bus for a number of bus clock cycles.

4. The method of claim 3, wherein the number of bus clock cycles is a programmable number of bus clock cycles.

5. The method of claim 1, further including further reducing the data bus clock frequency of the data bus to a non-zero value if the data bus is inactive for a second predetermined period of time, greater than the first predetermined period of time.

6. A method of managing power in an integrated circuit having at least one primary device capable of being communicatively coupled to the data bus and a plurality of secondary devices capable of being communicatively coupled to the data bus, the at least one primary device capable of actively accessing the plurality of secondary devices by initiating actions and transmitting commands to the plurality of secondary devices, and the secondary devices capable of performing actions in response thereto, the method comprising:
   providing scanned data output signals from a touch surface of the touch surface device to the controller;
   comparing values of the scanned data to a threshold;
   if the values of the scanned data exceed the threshold, terminating a low power mode of the controller and initiating a high power mode;
   in the high power mode, monitoring an activity level on the data bus by monitoring at least bus access requests by the at least one primary device ;
   reducing a data bus clock frequency of the data bus if the data bus is inactive for a first predetermined period of time;
   providing a clock signal to each of the plurality of second devices;
   turning off a clock frequency to at least one of the secondary devices unless there is an active access to the at least one secondary device by the at least one primary device or the at least one secondary device is in use.

7. A method of claim 6, further comprising:
providing a clock signal to the at least one primary device;
reducing, but not turning off a clock frequency to the at least one primary device if there is reduced or no activity on the data bus from the at least one primary device.

8. A computer system, comprising:
a sensor panel configured to generate an output signal indicative of a touch or no-touch condition on the panel;
a controller coupled to the sensor panel and configured to receive the output signal, the controller comprising at least one primary device capable of being communicatively coupled to the data bus and a plurality of secondary devices capable of being communicatively coupled to the data bus, the at least one primary device capable of actively accessing the plurality of secondary devices by initiating actions and transmitting commands to the plurality of secondary devices, and the secondary devices capable of performing actions in response thereto;
the sensor panel providing scanned data output signals from a touch surface of the sensor panel to the controller;
the controller operative for:
comparing values of the scanned data to a threshold; and
if the values of the scanned data exceed the threshold, terminating a low power mode of the controller and initiating a high power mode;
an arbiter coupled to the data bus and configured to monitor bus access requests made at least by the at least one primary device; and
a clock module, coupled to the arbiter, and configured to provide a separate clock signal to each of the at least one primary device and the plurality of secondary devices;
wherein the clock module:
reduces a data bus clock frequency of the data bus if the data bus is inactive for a first predetermined period of time; and
turns off a clock frequency to at least one of the secondary devices unless there is an active access to the at least one secondary device by the at least one primary device or the at least one secondary device is in use.

9. The system of claim 8 wherein a clock frequency applied to the data bus is slowed when the at least one primary device has not requested access to the bus for the first predetermined length of time.

10. The system of claim 9 wherein the at least one primary device comprises a microcontroller.

11. The system of claim 9 wherein the at least one primary device comprises a channel scan logic module.

12. The system of claim 9 wherein the at least one primary device comprises a direct memory access controller.

13. The system of claim 9 wherein the at least one secondary device comprises a boot ROM.

14. The system of claim 9 wherein the at least one secondary device comprises a serial peripheral interface.

15. A mobile telephone having touch surface interface, comprising:
a sensor panel configured to generate an output signal indicative of a touch or no-touch condition on the panel;
a controller coupled to the sensor panel and configured to receive the output signal, the controller comprising at least one primary device capable of being communicatively coupled to the data bus and a plurality of secondary devices capable of being communicatively coupled to the data bus, the at least one primary device capable of actively accessing the plurality of secondary devices by initiating actions and transmitting commands to the plurality of secondary devices, and the secondary devices capable of performing actions in response thereto;
the sensor panel providing scanned data output signals from a touch surface of the sensor panel to the controller;
the controller operative for:
comparing values of the scanned data to a threshold; and
if the values of the scanned data exceed the threshold, terminating a low power mode of the controller and initiating a high power mode;
an arbiter coupled to the data bus and configured to monitor bus access requests made at least by the at least one primary device; and
a clock module, coupled to the arbiter, and configured to provide a separate clock signal to each of the at least one primary device and the plurality of secondary devices;
wherein the clock module:
reduces a data bus clock frequency of the data bus if the data bus is inactive for a first predetermined period of time; and
turns off a clock frequency to at least one of the secondary devices unless there is an active access to the at least one secondary device by the at least one primary device or the at least one secondary device is in use.

16. A digital audio player having a touch surface interface, comprising:
a sensor panel configured to generate an output signal indicative of a touch or no-touch condition on the panel;
a controller coupled to the sensor panel and configured to receive the output signal, the controller comprising at least one primary device capable of being communicatively coupled to the data bus and a plurality of secondary devices capable of being communicatively coupled to the data bus, the at least one primary device actively capable of accessing the plurality of secondary devices by initiating actions and transmitting commands to the plurality of secondary devices, and the secondary devices capable of performing actions in response thereto;
the sensor panel providing scanned data output signals from a touch surface of the sensor panel to the controller;
the controller operative for:
comparing values of the scanned data to a threshold; and
if the values of the scanned data exceed the threshold, terminating a low power mode of the controller and initiating a high power mode;
an arbiter coupled to the data bus and configured to monitor bus access requests made at least by the at least one primary ; and
a clock module, coupled to the arbiter, and configured to provide a separate clock signal to each of the at least one primary device and the plurality of secondary devices;
wherein the clock module:
reduces a data bus clock frequency of the data bus if the data bus is inactive for a first predetermined period of time; and
turns off a clock frequency to at least one of the secondary devices unless there is an active access to the at least one secondary device by the at least one primary device or the at least one secondary device is in use.

17. A computer system, comprising:
means for providing output signals from a sensor panel to a controller, wherein the controller includes at least one primary device capable of being communicatively coupled to the data bus and a plurality of secondary devices capable of being communicatively coupled to the data bus, the at least one primary device actively capable of accessing the plurality of secondary devices by initiating actions and transmitting commands to the plurality of secondary devices, and the secondary devices capable of performing actions in response thereto;

the sensor panel providing scanned data output signals from a touch surface of the sensor panel to the controller;

the controller operative for:
comparing values of the scanned data to a threshold; and
if the values of the scanned data exceed the threshold, termininating a low power mode of the controller and initiating a high power mode;

means for monitoring an activity level on the data bus by monitoring bus access requests by at least the one primary device; and means for providing a separate clock signal to each of the at least one primary device and the plurality of secondary devices;

wherein the clock module includes:

means for reducing a data bus clock frequency of the data bus if the data bus is inactive for a first predetermined period of time; and means for turning off a clock frequency to at least one of the secondary devices unless there is an active access to the at least one secondary device by the at least one primary device or the at least one secondary device is in use.

* * * * *